Oct. 26, 1948.   P. A. BRICK   2,452,516
BODY TIPPING APPARATUS FOR MOTOR VEHICLES
Filed April 4, 1945   2 Sheets-Sheet 1

INVENTOR.
Perry A. Brick
BY
Oliver B. Kaiser
atty.

Oct. 26, 1948.  P. A. BRICK  2,452,516
BODY TIPPING APPARATUS FOR MOTOR VEHICLES
Filed April 4, 1945  2 Sheets-Sheet 2
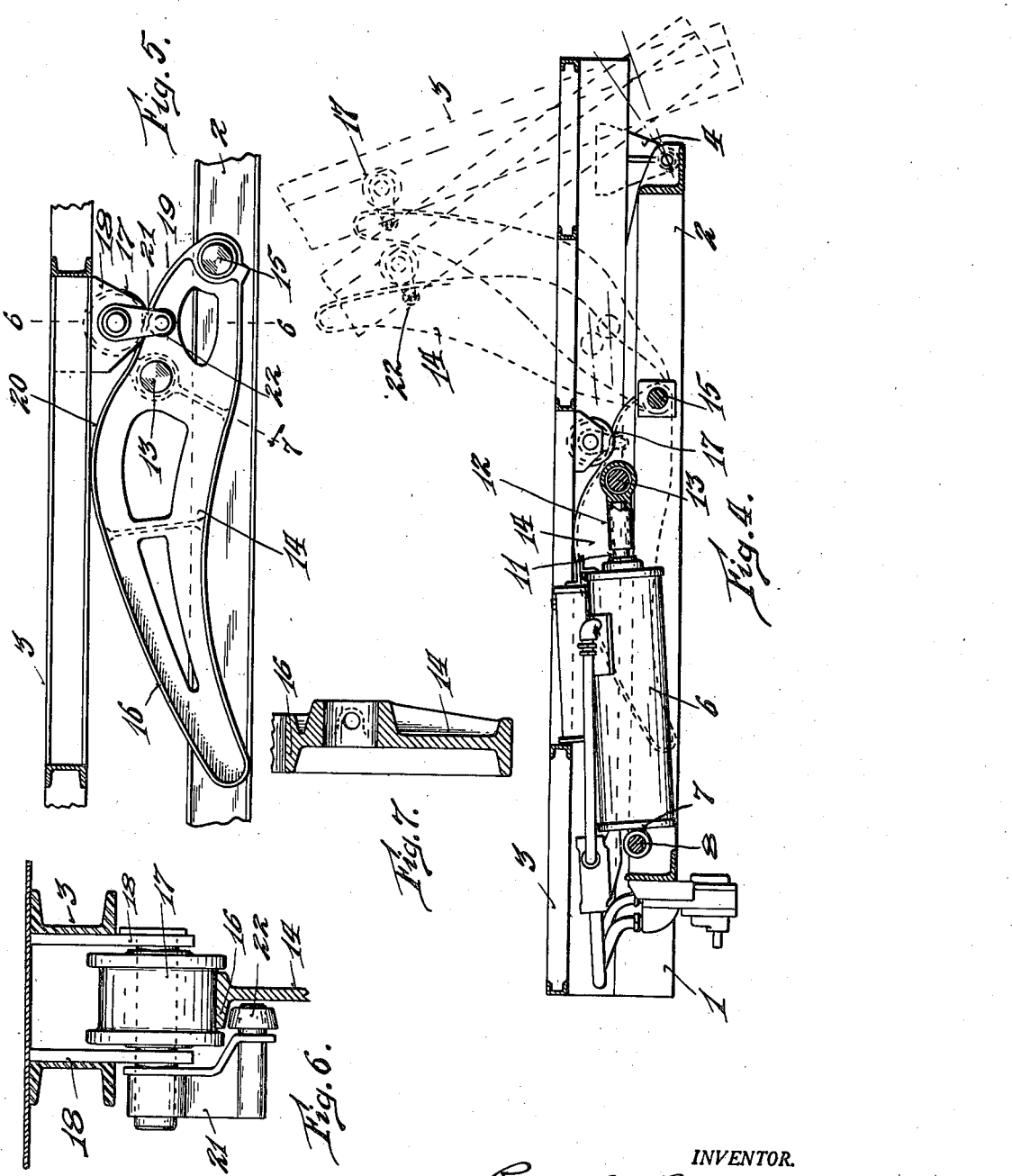
INVENTOR.
Perry A. Brick
Oliver B. Kaiser
atty.

Patented Oct. 26, 1948

2,452,516

UNITED STATES PATENT OFFICE 2,452,516

BODY TIPPING APPARATUS FOR MOTOR VEHICLES

Perry A. Brick, Galion, Ohio, assignor to The Perfection Steel Body Company, Galion, Ohio, a corporation of Ohio Application April 4, 1945, Serial No. 586,580

5 Claims. (Cl. 298—22)

This invention relates to improvements in hoists, particularly for tilting a dump body, of a motor vehicle or truck, operated by fluid pressure or a hydraulically actuated ram. Conventionally the dump body, at its rear end, is pivotally mounted upon the relative end of the chassis or body carrying frame of the motor vehicle, with the cylinder of the power unit pivotally mounted upon the chassis or chassis body carrying frame, centrally thereof, and normally lying in an approximately horizontal or slightly inclined plane, with the ram of the power unit moving a system of levers and linkage connecting the truck chassis and underframing of the dump body.

The greatest force is required in starting the tilting motion of the body under its full load and normal horizontal position, which heretofore, to enable the use of a relatively low powered hydraulic unit for applying the lifting pressure, resulted in the development of many different lever and compound linkage combinations in an endeavor to effect a relief to the lifting force, and while favorable action to a limited degree may be obtained for one point, the leverage was usually such as to require a higher pressure at or near the start, than during the succeeding portion of the lift. In some instances, the levers and linkage was also employed for obtaining an increase degree of body tilting angle without increase in ram stroke or hydraulic pressure, which however, involved the use of an undue number of parts, adding materially to the cost of manufacture not justified by the slight benefit gained.

An object of the invention is to provide a lifting mechanism for vehicle dump bodies of a simple construction and whereby all of the elements, in the initial lifting stage, when the body lies in a horizontal plane and under its load, offers the greatest resistance, are in intimate adjoining relation and coincident connecting line with the body for movement in a most effective body elevating direction, and combine, contribute and cooperate in relatively different and harmonious actions for compounding the lifting force and smoothness of operation, to the relief of the degree of hydraulic pressure ordinarily required for the starting stage in the various types of body hoisting mechanism now prevailing and heretofore employed.

The invention is primarily directed to a lifting mechanism for vehicle dump bodies embodying a pair of companion levers pivotally connected, at one end, to the vehicle chassis or dump body supporting framing upon the chassis and in unitary pivotal connection with the head end of a ram of a hydraulic unit. Each lever longitudinally provides a cam-shape track, respectively, for the travel of a roller depending from the underside of the body, for a floating connection between the body and lever. The arrangement of the elements in their normal position is such, that in the starting stage for lifting the body, the greatest mechanical advantage is accorded for a reduction in the hydraulic pressure required at the start of the lift. The levers in their pivotal connection with the head of the ram, control the angular swing of the ram and as an intermediary between the ram and body in an upward starting swing function as jack bars for body elevation. The cam surface for the traveling roller, forming the floating connection with the body further affiliates in imposing a lifting motion to the body and a shift in leverage. The floating connection, as the lifting advances, accelerates and increases the body swing. In this manner, the mechanical advantage at the start of the lift decreases as the lift progresses, due to the increasingly greater distance between the fulcrum axis of the levers and the point of contact of rollers and levers. This coincides with the constantly decreasing force required as the lift progresses, so that the hydraulic pressure is approximately constant throughout the greater portion of the lifting movement.

Another object is to provide a dump body lift composed of a pair of companion levers, each longitudinally providing a trackway for an anti-friction floating connection with the dump body, the trackway having relatively differently curved or arcuate sections for facilitating in the lifting action.

Another object is to provide a dump body lift composed of a pair of companion levers, each longitudinally constituting a trackway for a floating connection with the dump body and a hold back or tie connection as the body approaches a dumping angle and to a final degree of tilt, and which also accommodates for a smooth initial movement of the connected parts for a descent or return of the body.

Another object of the invention is to provide hoisting mechanism for vehicle dump bodies, embodying a pair of levers operated by a reciprocable ram connected with the levers as a unit, the levers having a traveling connection with the body adapting the body to be moved from its starting position to its load dumping angle under a substantially uniform power, and additionally providing for an accelerating movement of the body beyond an initial stage as the lifting progresses until it approaches a normal dumping angle, whereupon its movement is retarded until its final dumping angle is reached.

Another object is to provide a hoisting mechanism for vehicle dump bodies of simple and durable construction, primarily consisting of a pair of companion levers, in direct connection with the cross head of a hydraulic ram and in floating connection with the dump body.

Various other features and advantages of the invention will be more fully set forth in the description of the accompanying drawings, forming a part hereof and depicting a preferred embodiment, in which:

Figure 4 is an enlarged section on line 4—4, Figure 1.

Figure 5 is an enlarged side elevation of one of the body hoisting levers and its connection with the underframing of the body.

Figure 6 is an enlarged section on line 6—6, Figure 5.

Figure 7 is an enlarged section on line 7, Figure 5, of the body hoisting lever.

Figure 1:
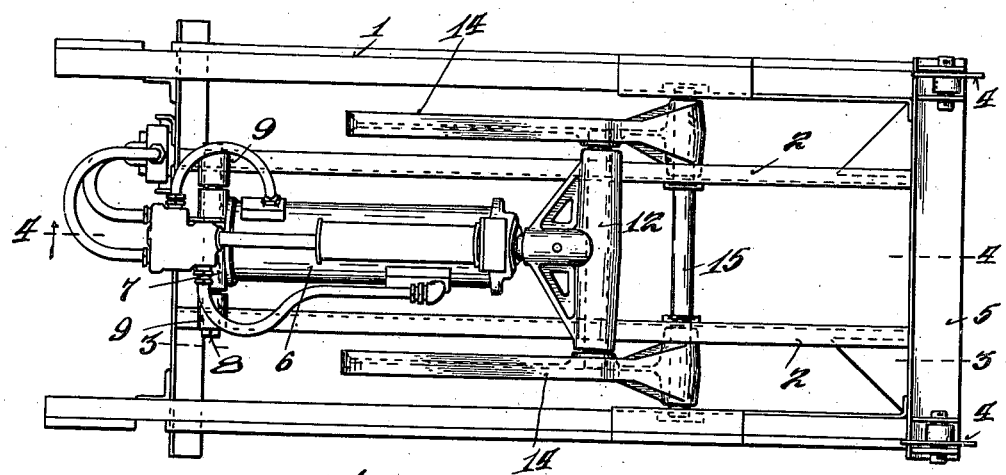
Figure 1 is a top plan view of a chassis, or subframe of the vehicle equipped with the hydraulic hoist mechanism and upon which the vehicle dump body is pivotally mounted.
Figure 2:
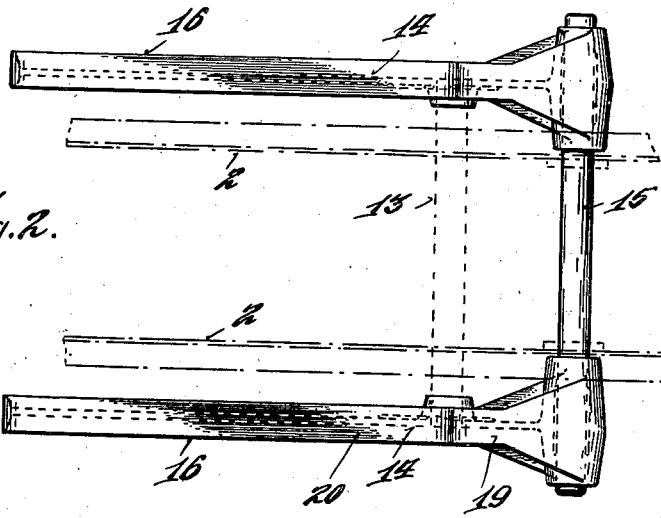
Figure 2 is an enlarged top plan view of the dump body hoisting levers.
Figure 3:
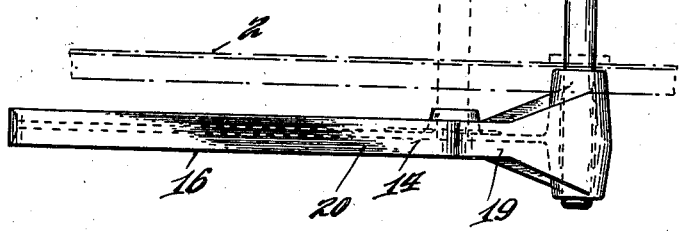
Figure 3 is an enlarged section on line 3—3, Figure 1, of the vehicle frame.

Referring to the drawings, I indicates the framing of a vehicle chassis or superframing upon the vehicle chassis, embodying a pair of spaced beams or rails 2, longitudinal of and intermediate of the frame, upon which the hoist is mounted. The vehicle chassis or supplemental framing for mounting and carrying the hoist and dump body may be of conventional type and in structural detail follows the standards adopted by various motor truck or vehicle manufacturers, readily applicable for convenient installation of the dump body and the hoisting mechanism, therefore detail description thereof and the construction of the dump body will be omitted, except as may be necessary for a clear and full exposition of the details to which the present invention is directed.

The body sub-frame 3, toward its rear end, is pivotally mounted upon the relative end of the vehicle frame, by brackets 4, fixed to and laterally extending from the body frame and each pivotally connected to and between a pair of strut plates, integral with the end cross beam 5, of the vehicle frame. The body hinge connection with the vehicle frame follows the general practice, such that the body swings upwardly and rearwardly in an arc for lifting and to tilt the same to appropriate dumping angles.

A hydraulic unit, is disposed longitudinally and centrally of the hoist carrying frame, composed of a cylinder 6, with its front head 7 of a form for mounting upon or carrying a rod 8, to provide trunnion extensions, each respectively journalling in a bearing 9, integral with or mounted upon a rail 2, longitudinally of the vehicle framing, one at each of the opposite sides of the cylinder 6 or hydraulic unit. The hydraulic unit is therefor pivotally mounted upon the vehicle frame to swing upwardly for an elevating or tilting movement of the dump body, following a general practice.

The cylinder is provided with a piston, having a rod 11, connected thereto, traversing the rearward cylinder head and has its rear end, exterior of the cylinder, socketed within and connected to a cross-head 12, carrying the trunnion shaft or rod 13, having its opposite ends, respectively each pivotally connected with a pair of companion levers 14, disposed at relative opposite sides of the hydraulic unit. The piston and the elements connecting it to the levers will be designated as a ram.

The oil or other suitable fluid is administered into the cylinder under pressure by any suitable means and includes provision for its control, which may be regarded as a part of the hydraulic or power unit and specifically as to detail of construction being separate and apart from the present invention need not be described in detail, herein.

Owing to the extreme degree of dumping angle to which the body can be pitched and resistant against a starting return by gravity, the power unit preferably is of a type rendering power available for both of alternate directions of ram travel or stroke to provide for power return starting movement of the body or for full return. The fluid control valve is mounted upon the fulcrumed end of the cylinder, having conduit connections respectively with the opposite end of the cylinder, and also with the pump mounted upon a front cross-rail of the vehicle sub-frame.

The lifting levers 14, being companion to each other, the detail description thereof, will be confined to the singular. In their plural number and spaced relation they operate as a unit and are utilized to provide a bearing connection at relatively opposite sides of the dump body for an equivalizing and balancing effect, following a common practice for dump body hoists.

Each lever at its fulcrumed end or terminal is of double hub or long hub formation for an increased bearing upon a cross bar or spindle 15, mounted within and cross-wise of the vehicle framing for a common support for both levers. The hub is disposed between parallel longitudinal rails of the vehicle framing, as a side rail and an intermediate rail 2, laterally confining the hub upon its supporting rod, and the hub, providing an extended width of bearing, stabilizes the lever against sway.

Primarily the levers 14, are journaled upon the spindle 15, supported by the intermediate longitudinal pair of rails 2, of the vehicle sub-frame, which also support and carry the spindle or rod 8, for pivotally mounting and sustaining the power cylinder 6. The levers are relatively at the outer side of the rails 2, while the cylinder is intermediate thereof, which simplifies the manufacture and assembly and the production of a more stabilized and compact structure.

The levers are directioned forwardly and longitudinally of the dump body and are of extended width, as of vane form, for increased strength and rigidity and for arcuating the upper edge. Each is bounded by a lateral flange 16, projecting from one or both sides of the lever, the upper side serving as a trackway and guide for a floating and hold back connection with the underframing of the dump body. The upper and outer surface of the flange or rail edge is of undulating or cam form, the flange providing a substantial gauge width for a tracking and tread bearing of a roller 17, journaled by a bracket 18, fixed to and depending from the underframing 3, of the vehicle body. The undulating form of track provides a series of progressively arranged curved or arced surfaces of relatively different radii, one of comparatively short radius for a primary section 19, lying between the fulcrum axis of the lever and the axis of the ram connection with the lever, functioning for the starting stage of the body lift and another as a secondary section 20, generated with a relatively long radius and eccentric, the two sections joining with a conversely curved portion or section.

The roller 17, as an element of the vehicle body, in traversing tread contact with the curved or cam shaped track surface of the lever provides a floating connection for imparting a thrust against the roller and translation thereof in lifting the body, which is variable as the lifting action progresses as well as being a factor in addition to the lever in governing the rate of movement of the body at various stages in the lifting operation. It serves to distribute the load upon the ram with substantial uniformity during a determined portion of the lifting period by the action of the roller traveling over the inclined portion of the track, starting near the rearward end of the lever and moving toward the forward extremity thereof, reducing the mechanical advantage in substantially the same degree as the force required is reduced.

In the normal position of the hoist, the roller contact with the lever is between the fulcrum axis of the lever and the axis of the ram connection with the lever and is relatively close to the fulcrum axis, and the lever swing is in a direction correspondingly with the vehicle body. The pivotal axis of the ram connection with the lever is at an elevation above the fulcrum axis of the lever and forward thereof and also fore of the line of contact of the roller upon the lever. Therefore, in the initial lifting stage, the ram, through the portion of the lever in contact with the roller, can be provided with as great a mechanical advantage as may be necessary for applying the requisite force against the body. As the ram moves rearward, it advances in an upward direction due to its connection with and upward swing of the lever and as the ram connection is forward of the line of contact of the roller upon the lever, the lever in moving upward qualifies as a jack-bar beneath the roller mechanically compounding the lifting force and the roller traveling upon the lever in an upwardly inclined direction further augments the lifting movement of the body. The parts all move harmoniously and smoothly.

The application of the power in the starting phase is at the most favorable point, there being no impediment due to linkage and relatively located connection between the ram and load necessitating additional power in starting, the initial power requirements therefore are materially reduced. As the lifting advances, the point of connection of the lever to the dump body varies greatly while the distance between the point of application of the force upon the fulcrum remains constant, so that the lifting force is then applied intermediate the fulcrum and the point of connection of the dump body. Correspondingly, there is also a shift in the center of gravity of the load moving to the rear to the relief of the lifting force, resulting in a higher speed of lifting without increase in lifting force, so that the force remains substantially constant during the lifting operation, as well as providing for a minimum length of ram stroke.

To permit the body to be moved to an extreme dumping or tilting angle, and provide the lift with a body hold back connection, a link 21, is pivotally connected with the journal stud of the roller 17, adjoining one side of the roller and extends radially therefrom to intersect the outer edge of the flange 16 of the lever. The outer or free end of the link 21, carried a roller 22, in travelling contact with the underside of the flange.

The rollers 17 and 22, in link connection, therefore combine to provide an anti-friction floating coupling of the body with the lever, the roller 22, being effective at the end of the lever to maintain a coupling connection of the body and lever at any dumping angle to which the body can be moved and as a hold back therefore at an extreme or limit of body dumping angle as the flange 16, curves about the end of the lever forming a socket to receive the roller 22. In a starting return stroke of the lever, the roller 22, substitutes for the roller 17, to draw the body downward until the weight of the body is against, transferred or imposed upon the roller 17. The inclination of the flange provides for a smooth starting action under a minimum of power. As the lift permits the body to be tilted to angle at which the lever is disposed as a brace to sustain the body, power is required for a starting descending movement of the parts, therefore the power unit necessarily must be of a type having a control to render the power available for at least a starting lowering movement of the body.

It is obvious that the ram connection with the levers 14, may be positioned further forward, away from the roller bearing contact of the body thereon when in normal position, to increase the distance between the lever fulcrum and ram connection, in substitution of the close-up position or connection shown in the drawings, to provide greater leverage for use on heavier loads. This will require a slightly greater ram stroke to tilt the body to extreme dumping angles, and by varying the distance between fulcrum, roller and ram connection it is possible to obtain the most favorable leverage for different sizes of bodies and load carrying capacities and compensation for a decreasing amount of force to lift the body.

Aside from the mechanical and power reducing advantages, the structure provides for an exceedingly smooth operation and reduction of parts over prevailing constructions. The levers are of sturdy construction and with their extended fulcrum upon a common axis and joining connection with the cross head of the ram are sustained and supported against quiver, leaving no opportunity for any twisting or canting to throw the levers out of relative registration and disturbing influence upon the moving body to add frictional resistance to increase the burden for the elevating power.

Having described my invention, I claim:

1. In a vehicle, including a body carrying frame, the body pivotally mounted on the rear end of the frame to swing from the frame to a tilted position for dumping, a pair of spaced levers, at one end pivotally mounted upon the frame upon a fulcrum axis forward of the pivotal connection of the body, a hydraulic ram disposed intermediate of the levers, pivotally joined to the levers forward of their pivotal connection to the frame, and having its power cylinder pivotally mounted upon the vehicle frame, the body having a traveling connection, respectively, upon the levers for movement thereon in the body lifting and descending movements of the levers and in the normal horizontal rest position and initial lifting stage has contact with the levers between the lever fulcrum and ram connection therewith and moving therebeyond toward the free end of the levers as the lifting progresses thereby transfer the ram and lever connection intermediate of the lever fulcrum and body bearing connection on the lever.

2. In a vehicle, including a frame having a tiltable body pivotally mounted thereto for swinging the body to a load dumping angle, a pair of relatively spaced companion levers mounted upon said frame directioned for coordinate movement with the body and therebeneath for a bearing connection therewith, the levers longitudinally of beam form having a lateral flange longitudinal of its edge in adjoining relation to the base of the body and extending about the forward end of the lever, a roller, respectively, for each lever carried by the body and translatably bearing upon the flange of the lever, and a second roller respectively for each lever hingedly carried by the body radially of the axis of the first roller for engagement with a relative opposite side of the lever flange for translatably coupling the body to the lever.

3. In a vehicle including a frame having a tiltable body pivotally mounted thereon for swinging the body to a load dumping angle, a pair of relatively spaced companion levers pivotally mounted upon said frame directioned for coordinate movement with the body and therebeneath, the body having an antifriction bearing contact respectively upon said levers for traverse longitudinally thereupon and a hydraulic ram between the forward portion of the levers pivotally mounted on said frame and having its plunger pivotally connected to said levers forward of their pivotal connection to said frame, the body in its normal horizontal position having a bearing contact upon the levers between said plunger connection with the levers and their pivotal connection on the frame for the initial body tilting stage and translatable upon the levers toward the forward end thereof for transfer of the body bearing contact forward of the plunger connection with the levers for increasing the body rate and degree of swing and relatively reducing the degree of ram movement.

4. In a vehicle, including a frame having a tiltable body pivotally mounted thereon for swinging the body to a load dumping angle, a pair of relatively spaced companion levers pivotally mounted on said frame beneath the body and directioned for coordinately moving the body therewith, a pair of rollers, as a main and auxiliary respectively for each lever, relatively in counter tread bearing engagement with the lever, the main roller carried by the body translatably sustaining the body upon the lever for moving the body to a tilting position and the auxiliary roller in pivoted link connection with the main roller to couple and anchor the body to the lever in its tilted position and means for actuating said levers as a unit.

5. In a vehicle, including a frame having a tiltable body pivotally mounted thereon for swinging the body to a load dumping angle, a pair of relatively spaced companion levers pivotally mounted upon said frame beneath the body for a bearing engagement therewith and directioned for coordinately moving the body, a hydraulic ram disposed between said levers, pivotally mounted on said frame with its movable plunger pivotally connected to said levers for unitary action, a roller, respectively for each of said levers carried by the body providing a translatable tread bearing connection with the lever for moving the body therewith to a tilting position and a coupling element in pivoted link connection with the body, axially of said roller, and in translatable engagement with the lever to anchor the body to the lever in its tilted position.

PERRY A. BRICK.

REFERENCES CITED

The following references are of record in the file of this patent:

UNITED STATES PATENTS

| Number | Name | Date |
| --- | --- | --- |
| 1,175,617 | DeVries | Mar. 14, 1916 |
| 1,582,740 | Fager | Apr. 27, 1926 |
| 1,985,361 | Anthony et al. | Dec. 25, 1934 |
| 2,190,869 | Frentzel, Jr., et al. | Feb. 20, 1940 |
| 2,358,224 | Golay | Sept. 12, 1944 |